Nov. 28, 1944.　　　　　I. L. WOLK　　　　　2,363,716
CATALYTIC CONVERSION OF HYDROCARBONS
Filed May 24, 1943
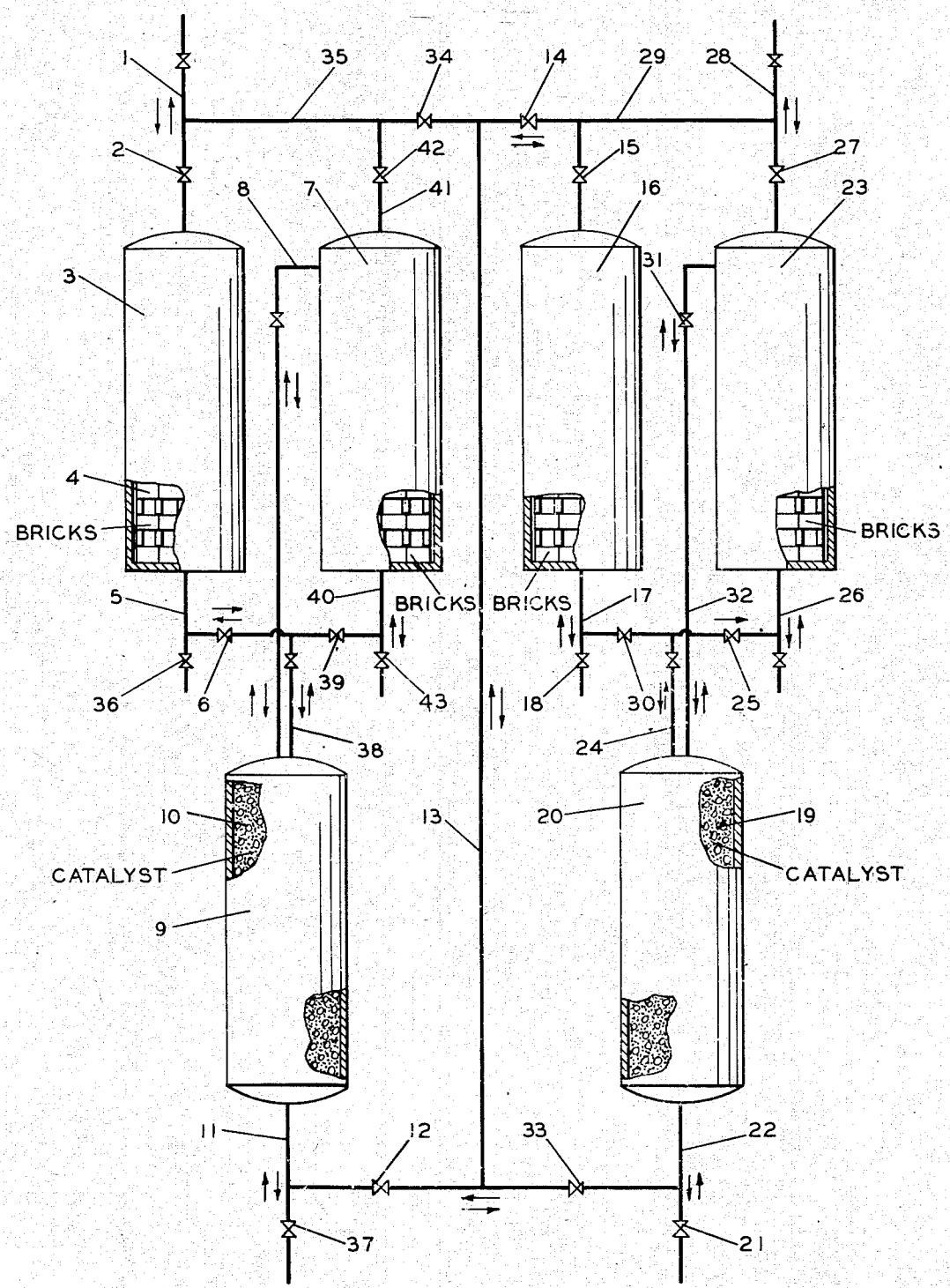
INVENTOR
I. L. WOLK
BY Hudson, Young & Yinger
ATTORNEYS Patented Nov. 28, 1944

2,363,716

UNITED STATES PATENT OFFICE 2,363,716

CATALYTIC CONVERSION OF HYDROCARBONS

I. Louis Wolk, Bartlesville, Okla., assignor to Phillips Petroleum Company, a corporation of Delaware Application May 24, 1943, Serial No. 488,227

5 Claims. (Cl. 196—52)

The present invention relates to catalytic hydrocarbon conversion processes in which catalyst is deactivated by deposition of carbonaceous material thereon and is periodically regenerated by combustion of said material. More particularly it relates to endothermic reactions of this type wherein substantial decrease in temperature during the conversion may occur, particularly in such reactions as cracking.

In these reactions efficiency of conversion is affected by the temperature drop during reaction, necessitating supply of heat thereto or to the feed. Furthermore substantial heat is required to raise the feed to reaction temperature. Ordinarily a substantial amount of the heat liberated during the exothermic oxidative regeneration reaction is wasted and it is desirable that this heat should be conserved. Furthermore the heat contained in hot effluents from the reaction zone is usually at least partly wasted during the cooling and fractionation required in order to effect separation of desired products.

It is an object of the present invention to provide a process and apparatus wherein exothermic heat of combustion from the regeneration zone and heat contained in effluent from the conversion zone are utilized in a novel and efficient manner to supply at least a portion of the heat required to preheat feed to the conversion zone.

A further object is to provide a process and apparatus which will effectively utilize short reaction and regeneration cycles while at the same time storing heat from both cycles for use in preheating feed. This results in operation of the conversion with maximum catalyst activity and heat transfer is effected under optimum conditions.

Process and apparatus of the type now used in fixed catalyst bed operations provide at least two chambers containing catalyst. Conversion takes place in one chamber while the spent catalyst from a previous conversion in the other chamber is regenerated, these chambers being alternated in accordance with the time allotted to conversion and regeneration. In utilizing moving catalyst, reaction is carried out in one zone, with deactivated catalyst flowing through a regeneration zone before reintroduction into the reaction zone.

In the present invention, applicable to either fixed bed or mobile catalyst systems, heat contained in the effluents from either or both the reaction and regeneration zones is conserved for preheating feed to these zones in another cycle of reaction and regeneration. By contacting hot effluents from the conversion or regeneration zones, or both, with refractory heat absorbent material, a substantial proportion of the sensible heat contained in these streams may be absorbed and retained very efficiently by direct heat exchange. On contacting hydrocarbon feed with the thus-heated refractory material, said feed may be preheated to a desired point, and by properly correlating the nature and volume of refractory material to the flow rate and contact time of the respective streams, and by alternating a plurality of heat absorbers between heat absorbing and heat liberating cycles, important economies of heat may be provided while permitting efficient operation of the catalytic process.

In customary practice, the effluent from the conversion zone is at or near reaction temperatures and must be cooled prior to or during treatment for recovery of desired products. Thus it can be seen that in so doing the sensible heat contained in this stream is wasted. In accordance with present practice, carbon-deactivated catalysts are regenerated by oxidation of carbon with oxygen-containing gases at combustion temperatures. The resultant products of combustion are at elevated temperatures since the reaction is exothermic, and contain a great amount of sensible heat which it is desired to utilize in an efficient manner.

In accordance with the present invention means are provided for separately absorbing heat from either the reaction effluent or the regeneration effluent, or both, on one cycle, giving up this heat to hydrocarbon feed on another cycle, while absorbing heat from effluents of this cycle in other heat absorbing means, the cycles being alternated in a manner which will enable the operation to be carried out continuously.

In the drawing, which illustrates a preferred embodiment of the process and apparatus as applied to a fixed bed catalytic cracking system, gas oil or other hydrocarbon feed is introduced into the system via line 1 through valve 2 and into heat exchange zone 3 containing heat retaining material 4 arranged as checkerwork as shown or in other desired manner. This material may be carborundum, firebrick, alundum, or other suitable heat retainer. In this chamber the heat retainer has previously been heated in the manner hereinafter described and imparts a substantial portion of the heat contained therein to the feed. From this preheating zone the feed flows via line 5 and valves 6 and 39 and line 40 into zone 7 containing additional heat retainer. This zone is at a higher temperature than zone 3, the heat retainer having previously been heated in a manner to be described. The feed leaves this zone at reaction temperatures via line 8 and through reaction zone 9 containing active cracking catalyst 10.

The hot effluents leave reaction zone 9 at or near reaction temperatures via line 11, valve 12, line 13, and valve 14, and are conducted through valve 15 into chamber 16 which contains heat retainer which has previously been cooled in preheating feed in a position corresponding to zone 3. Sensible heat of the reaction effluent is absorbed by the heat retainer in zone 16, the effluent being cooled at the same time and being removed via line 17 and valve 18 for passage to suitable fractionating or other product recovery means not shown.

Simultaneously, deactivated catalyst 19 in zone 20 is being reactivated by introduction of an oxygen-containing gas via valve 21 and line 22. Due to combustion of carbon in the regeneration reaction, considerable heat is evolved and the hot regeneration effluent is introduced via line 24, valve 25, and line 26 into zone 23 containing heat retainer where the regeneration heat is absorbed by the heat retainer, the cooled regeneration gases being removed via valve 27 and line 28.

When regeneration is complete, zones 20 and 23 are given a short purge by flowing purge gas such as steam or combustion gas therethrough via valve 21 and line 22. The purge gas may be at or near regeneration temperature, but preferably it is considerably cooler. The purge thus functions to cool the hot catalyst somewhat toward conversion temperatures, and the steam or other purge gas being thus heated by contact with the catalyst does not cool the heat retaining material in zone 23 extensively, yet is obtained at a temperature near regeneration temperature, and may be later utilized to greater advantage in generating power or the like by being thus obtained at a relatively high temperature. Thus, for example, 300° F. steam may be used in purging the catalyst bed; only a relatively small amount of steam need be used, say 2 cubic feet per cubic foot of catalyst where the catalyst is at say 1200° F., and the temperature of the steam will be raised several hunderd degrees, while effectively reducing the surface temperature of the catalyst particles to a value nearer conversion temperatures. In this way excessive carbonization, which sometimes occurs upon introduction of hydrocarbon feed to a hot regenerated catalyst, is effectively minimized. If the purge were made in the opposite direction, the heat retaining material, which is at a desirable temperature for preheating feed in the next cycle, would be unduly cooled, while the catalyst surface would remain at a temperature favoring the carbonization referred to.

On the next cycle, feed, preferably vaporized, is introduced via lines 28 and 29 and valve 15 into preheating zone 16 thence into zone 23 for further heating through line 17, valves 30 and 25, and line 26. The preheated feed then flows into zone 20, now the reaction zone, via valve 31 and line 32. The hot effluents therefrom flow through line 22 and valve 33 into preheating zone 3 via line 13, valve 34, line 35, and valve 2, where the heat retaining material is re-heated and the effluent cooled and then removed via line 5 and valve 36. Meanwhile, after a short purge of chambers 9 and 7 with steam or inert gas, regenerating gas is introduced into zone 9 containing deactivated catalyst 10 via valve 37 and line 11, the hot effluent being removed via line 8 and introduced into zone 7. In this zone the heat of regeneration serves to re-heat regenerative material therein, the cooled gases leaving via line 40 and valve 43. Lines 38 and 41 and valve 42, as well as other lines and valves, are provided for use when needed, as when the relative positions of the various chambers in the cycle are to be shifted.

Depending on the feed and products desired as well as the catalyst, cracking may be carried out at temperatures of about 800–1200° F., pressures ranging from atmospheric up to 100 pounds per square inch, and contact times corresponding to a space velocity of about 0.2 to 5 liquid volumes of oil per volume of catalyst per hour. While the length of reaction cycle is variable in accordance with depth of cracking and size of regenerative preheaters, under normal conditions conversion cycles ranging from 5 to 15 minutes in length before regeneration, may be used.

Where substantial amounts of carbon are deposited during the conversion cycle, sufficient heat of combustion may be developed to permit the zones contacted by reaction effluents to be eliminated and the heat exchange effected by contact with a single pair of zones containing regenerative material alternately contacted with hot regeneration effluent.

The respective heat retaining zones preferably are occasionally alternated in position, so that the two zones which alternately are contacted by the hot reaction effluents, may contact the hot regeneration effluents. This is for the purpose of periodically removing any carbon or hydrocarbons which tend to deposit on or into the heat carrier, by combustion with oxygen contained in the regeneration effluent.

To illustrate the process, a 35° A. P. I. gas oil is catalytically cracked in a conversion zone of the above apparatus. The catalyst chamber contains about 12 cubic feet of catalyst which may be an acid treated clay, synthetic silica-alumina, "Super Filtrol," or the like, ranging from about 4 to 30 mesh in size. The oil flow rate is 175 gallons per hour and steam is admixed with the oil as a diluent in the ratio of one mol of steam per mol of oil. Each catalyst chamber is operated on a ten minute conversion cycle. The oil-catalyst ratio is about two liquid volumes of oil per volume of catalyst per hour. The quantity of oil heated will, therefore, be about 200 lbs. per cycle. The oil is preheated to a temperature of about 1,000° F., a 300 degree rise in temperature being imparted by flow through the two regenerative preheaters. The reaction products leaving the catalyst zone at a temperature of about 950° F. flow through one of the regenerative preheaters. Each of the preheaters contains 480 carborundum "splits" 1¼ x 4½" x 9" arranged on edge end to end and in alternate layers with the bricks in each layer spaced about 1" apart and parallel, all the bricks in each layer being at right angles to those in the adjacent layer. There are 12 layers with 40 bricks in each layer.

At the same time, the other catalyst chamber containing deactivated catalyst from a previous conversion cycle is being regenerated. The carbon content of the catalyst corresponds to about 3% by weight of the feed. Regeneration is effected by flowing through the catalyst bed a hot combustion gas containing 2% oxygen. The effluent regeneration gas leaves at a temperature of about 1250° F. and contacts the regenerative material in the second preheater and gives up a substantial portion of its heat thereto. This preheater has the same design as that on the conversion effluent. Preliminary purging of the second preheater may be carried out by flowing superheated steam for about one minute through the catalyst zone and then through the regenerative preheater before initiating flow of oxygen-containing gas for the purpose of removing hydrocarbons retained in these zones. After running the regeneration gas through for eight minutes, the reactivated catalyst zone is purged with superheated steam for one minute, the purge gas also flowing through the preheater for purging thereof. At this point the flow of feed is reversed and first goes through the preheater heated in the previous cycle by the conversion effluent and then through the preheater heated by the regeneration effluent in the previous cycle. In the first preheater, the refractory is at an average temperature of 850–875° F., the feed being preheated to about 800° F. At this temperature the feed enters the second preheater in which the brick is at an average temperature of about 1150° F. and is heated therein to about 1000° F. at which temperature it enters the conversion zone. Meanwhile the portions of the apparatus just used for conversion are subjected to a regeneration cycle. The total effluent from the catalytic cracking zones contains about 50 volume per cent of hydrocarbons suitable for use as a high grade motor fuel, the remainder being gases and cycle oil.

The foregoing procedure may be applied to any hydrocarbon conversion reaction conducted at elevated temperatures and which requires preheating of feed, and in which catalyst is deactivated by deposition of carbon thereon. Such reactions, besides cracking, include dehydrogenation, aromatization, desulfurization, reforming, polymerization, etc. Where carbon deposition is substantial and regeneration temperatures are permitted to rise sufficiently, the first preheating zone may be dispensed with, and by increasing the size of the single preheater for each cycle, sufficient heat may be stored and transferred therefrom to permit the heat of combustion to supply the heat required for preheating.

The invention has been described primarily with reference to conversion processes effected at temperatures lower than regeneration temperatures, which is the more usual case. In instances wherein conversion temperatures are above regeneration temperatures, suitable modifications may be made readily by one skilled in the art so that the feed being preheated will always come into contact with the hottest body of heat retentive material last.

The design of the regenerative preheaters is in accordance with known principles of heat transfer and must be coordinated to specific heat and density of refractory and volume and spacing thereof, as well as volume and nature of feed and the temperature gradient to be imparted thereto. While carborundum is a preferred material because of its relatively high thermal conductivity and heat storage capacity, other refractory or heat absorbent materials such as alundum and firebrick may be used.

I claim:

1. In a process for the catalytic conversion of hydrocarbons in which the catalyst is deactivated by deposition of carbon thereon and reactivated by contact with oxygen-containing gas in a regeneration zone, the steps which comprise contacting the effluents from a reaction zone at substantially reaction temperature with the first of a pair of bodies of heat retaining material, contacting the effluents from a regeneration zone at substantially regeneration temperature with the second of said pair of bodies of heat retaining material, preheating a hydrocarbon feed prior to introduction into a reaction zone by first contacting said feed with said first body of heat retaining material and then with second body of heat retaining material, and during said preheating contacting another pair of bodies of heat retaining material respectively with reaction and regeneration effluents to absorb heat therein in preparation for preheating feed in another cycle.

2. A process for the catalytic cracking of hydrocarbons which comprises flowing hydrocarbon feed through a first catalyst zone containing active catalyst under conversion conditions, simultaneously flowing oxygen-containing gas through a second catalyst zone containing deactivated catalyst from a previous conversion under combustion conditions, flowing hot effluents from said first catalyst zone through the first of a pair of heat retaining zones, flowing hot effluents from said second catalyst zone through the second of said pair of heat retaining zones, reversing said catalyst zones by utilizing the second zone for conversion and the first zone for regeneration, flowing hydrocarbon feed through said first heat retaining zone and then through said second heat retaining zone for preheating said feed prior to introduction into said second catalyst zone, and during said preheating contacting another pair of heat retaining zones respectively with effluents from said first and second catalyst zones to absorb heat therein in preparation for preheating feed in another cycle.

3. A process according to claim 2 in which, prior to reversing said catalyst zones, relatively cool purge gas is passed first through said second catalyst zone and then through said second heat retaining zone to purge oxygen-containing material therefrom and to reduce the surface temperature of the reactivated catalyst to a value near conversion temperature.

4. Apparatus for catalytic conversion of hydrocarbons which comprises a pair of catalyst chambers, active conversion catalyst in one of said chambers and deactivated catalyst in the other of said chambers, a pair of heat retaining chambers containing heat retaining material therein, means for contacting hydrocarbon reactants with said active catalyst, means for contacting reaction effluent with the heat retaining material in the first of said pair of heat retaining chambers, means for contacting oxygen-containing gas with said deactivated catalyst to effect regeneration thereof, means for contacting regeneration effluent with the heat retaining material in the second of said pair of heat retaining chambers, and means for contacting hydrocarbon reactants with the heat retaining material in said first and second heat retaining chambers for preheating same prior to contacting same with active catalyst.

5. Apparatus according to claim 4 also comprising means for periodically contacting reaction effluent with the heat retaining material in the second of said pair of heat retaining chambers and for contacting regeneration effluent containing oxygen with the heat retaining material in the first of said pair of heat retaining chambers to periodically burn any carbon therefrom.

I. LOUIS WOLK.